United States Patent [19]
Young

[11] Patent Number: 5,533,554
[45] Date of Patent: Jul. 9, 1996

[54] ENGINE OIL DRAINING SYSTEM

[76] Inventor: Michael E. Young, 42 Euclid Ave., San Leandro, Calif. 94577

[21] Appl. No.: 446,458

[22] Filed: May 22, 1995

[51] Int. Cl.⁶ .................. B65B 1/04; B65B 3/00; B67C 3/00
[52] U.S. Cl. .................. 141/383.000; 141/354; 141/386; 184/1.5; 123/198 DA
[58] Field of Search ............... 141/98, 383, 386, 141/384, 364, 365; 184/1.5; 123/198 DA; 285/3; 210/248

[56]     References Cited
U.S. PATENT DOCUMENTS 4,177,529  12/1979  Sikula ........................ 7/100
4,776,431  10/1988  Poling ........................ 184/1.5
5,246,086   9/1993  Yunick ....................... 184/1.5
5,327,862   7/1994  Bedi .......................... 184/1.5

*Primary Examiner*—Henry J. Recla
*Assistant Examiner*—Timothy L. Maust

[57]     ABSTRACT

A system for draining oil from an engine through an oil filter of the engine. The inventive device includes an oil filter having a threaded fluid tap extending therefrom. A coupler can be secured to the threaded fluid tap and to a fluid conduit to permit draining oil from the engine into a container.

2 Claims, 3 Drawing Sheets

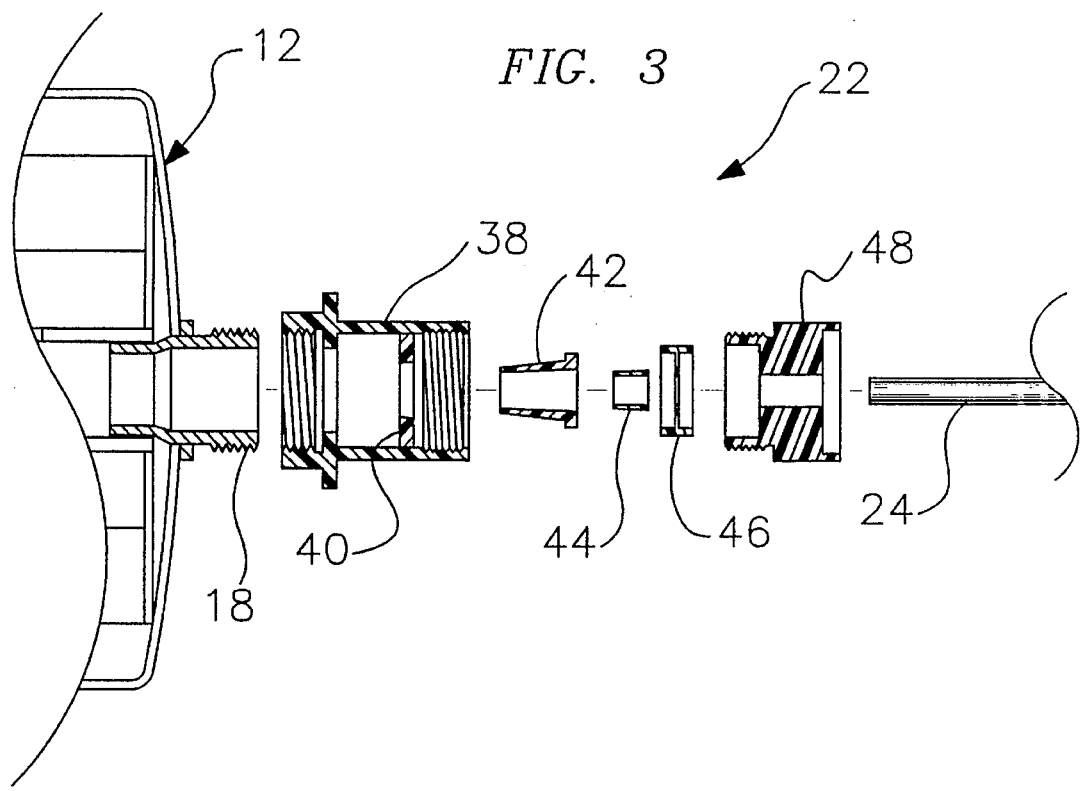
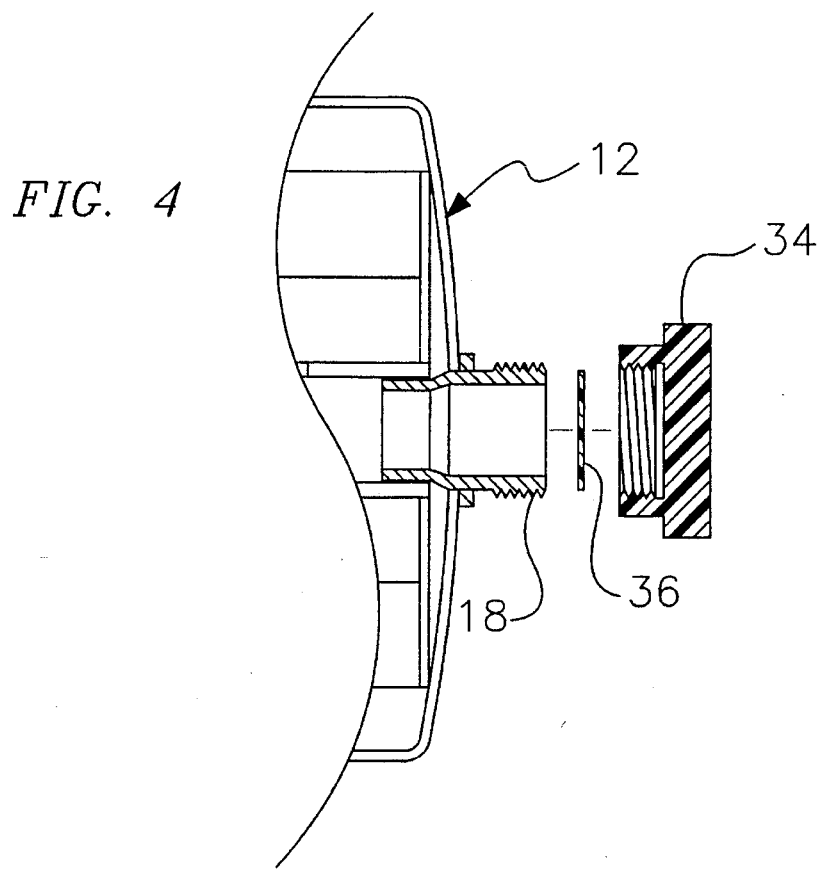

ENGINE OIL DRAINING SYSTEM

BACKGROUND OF THE INVENTION

1. Related Data

The subject matter of the present utility patent application has been registered under the disclosure document program at the United States Patent and Trademark Office. The request was received at the Patent Office on Aug. 19, 1994 and was assigned the registration number 360,061.

2. Field of the Invention

The present invention relates to oil handling devices and more particularly pertains to an engine oil draining system for draining oil from an engine through an oil filter thereof.

3. Description of the Prior Art

The use of oil handling devices is known in the prior art. More specifically, oil handling devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art oil handling devices include U.S. Pat. No. 3,806,085; U.S. Pat. No. 5,209,198; U.S. Pat. No. 5,168,844; U.S. Pat. No. 5,117,876; and U.S. Pat. No. 5,196,112.

While these devices fulfill their respective, particular objectives and requirements, the aforementioned patents do not disclose an engine oil draining system for draining oil from an engine through an oil filter thereof which includes an oil filter having a threaded fluid tap extending therefrom, and a coupler which can be secured to the threaded fluid tap and to a fluid conduit to permit draining of oil from the engine into a container.

In these respects, the engine oil draining system according to the present invention substantially departs from the conventional concepts and designs of the prior art, and in so doing provides an apparatus primarily developed for the purpose of draining oil from an engine through an oil filter coupled to the engine.

SUMMARY OF THE INVENTION

In view of the foregoing disadvantages inherent in the known types of oil handling devices now present in the prior art, the present invention provides a new engine oil draining system construction wherein the same can be utilized for draining oil from an engine. As such, the general purpose of the present invention, which will be described subsequently in greater detail, is to provide a new engine oil draining system apparatus and method which has many of the advantages of the oil handling devices mentioned heretofore and many novel features that result in a engine oil draining system which is not anticipated, rendered obvious, suggested, or even implied by any of the prior art oil handling devices, either alone or in any combination thereof.

To attain this, the present invention generally comprises a system for draining oil from an engine through an oil filter of the engine. The inventive device includes an oil filter having a threaded fluid tap extending therefrom. A coupler can be secured to the threaded fluid tap and to a fluid conduit to permit draining oil from the engine into a container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new engine oil draining system apparatus and method which has many of the advantages of the oil handling devices mentioned heretofore and many novel features that result in a engine oil draining system which is not anticipated, rendered obvious, suggested, or even implied by any of the prior art oil handling devices, either alone or in any combination thereof.

It is another object of the present invention to provide a new engine oil draining system which may be easily and efficiently manufactured and marketed.

It is a further object of the present invention to provide a new engine oil draining system which is of a durable and reliable construction.

An even further object of the present invention is to provide a new engine oil draining system which is susceptible of a low cost of manufacture with regard to both materials and labor, and which accordingly is then susceptible of low prices of sale to the consuming public, thereby making such engine oil draining systems economically available to the buying public.

Still yet another object of the present invention is to provide a new engine oil draining system which provides in the apparatuses and methods of the prior art some of the advantages thereof, while simultaneously overcoming some of the disadvantages normally associated therewith.

Still another object of the present invention is to provide a new engine oil draining system for draining oil from an engine through an oil filter coupled to the engine.

Yet another object of the present invention is to provide a new engine oil draining system which includes an oil filter having a threaded fluid tap extending therefrom, and a coupler which can be secured to the threaded fluid tap and to a fluid conduit to permit draining of oil from the engine into a container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an exploded cross sectional illustration of the portion of the invention illustrated in FIG. 2.

FIG. 4 is an exploded cross sectional view of the invention including a closure cap.

DESCRIPTION OF THE PREFERRED EMBODIMENT

Figure 1:
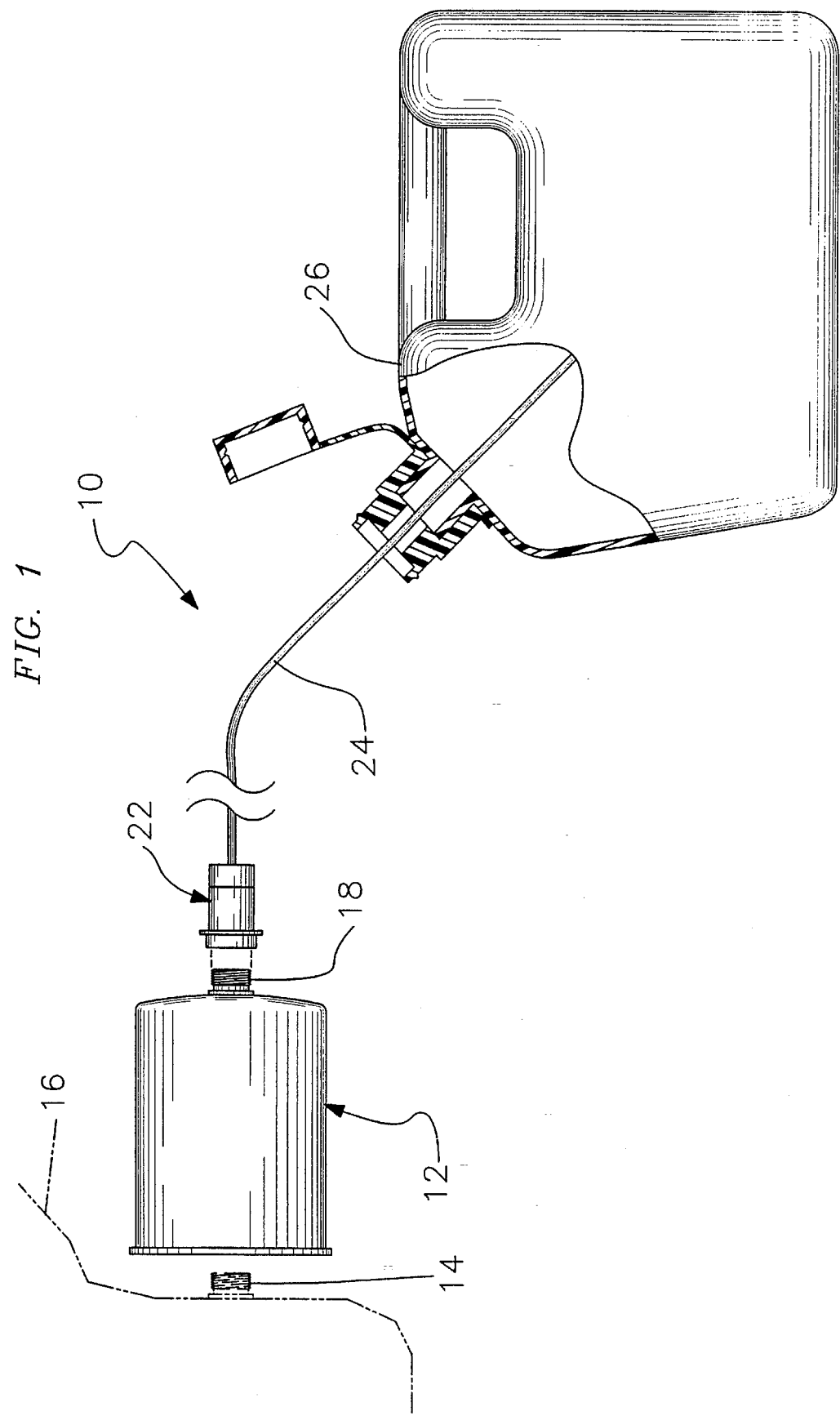
FIG. 1 is an exploded elevation view of an engine oil draining system according to the present invention.

With reference now to the drawings, and in particular to FIGS. 1–4 thereof, a new engine oil draining system embodying the principles and concepts of the present invention and generally designated by the reference numeral 10 will be described.

More specifically, it will be noted that the engine oil draining system 10 comprises an oil filter 12 which can be coupled to an oil filter fitting 14 of an engine 16, as shown in FIG. 1 of the drawings. The oil filter 12 includes a threaded fluid tap 18 extending through the exterior casing 20 of the oil filter which can be mated with a coupling means 22 for coupling a drain conduit 24 into fluid communication with an interior of the oil filter 12. The drain conduit 24 can be extended into a container 26 so as to receive oil from the oil filter 12 during a oil changing procedure extracting oil from the engine 16.

Figure 2:
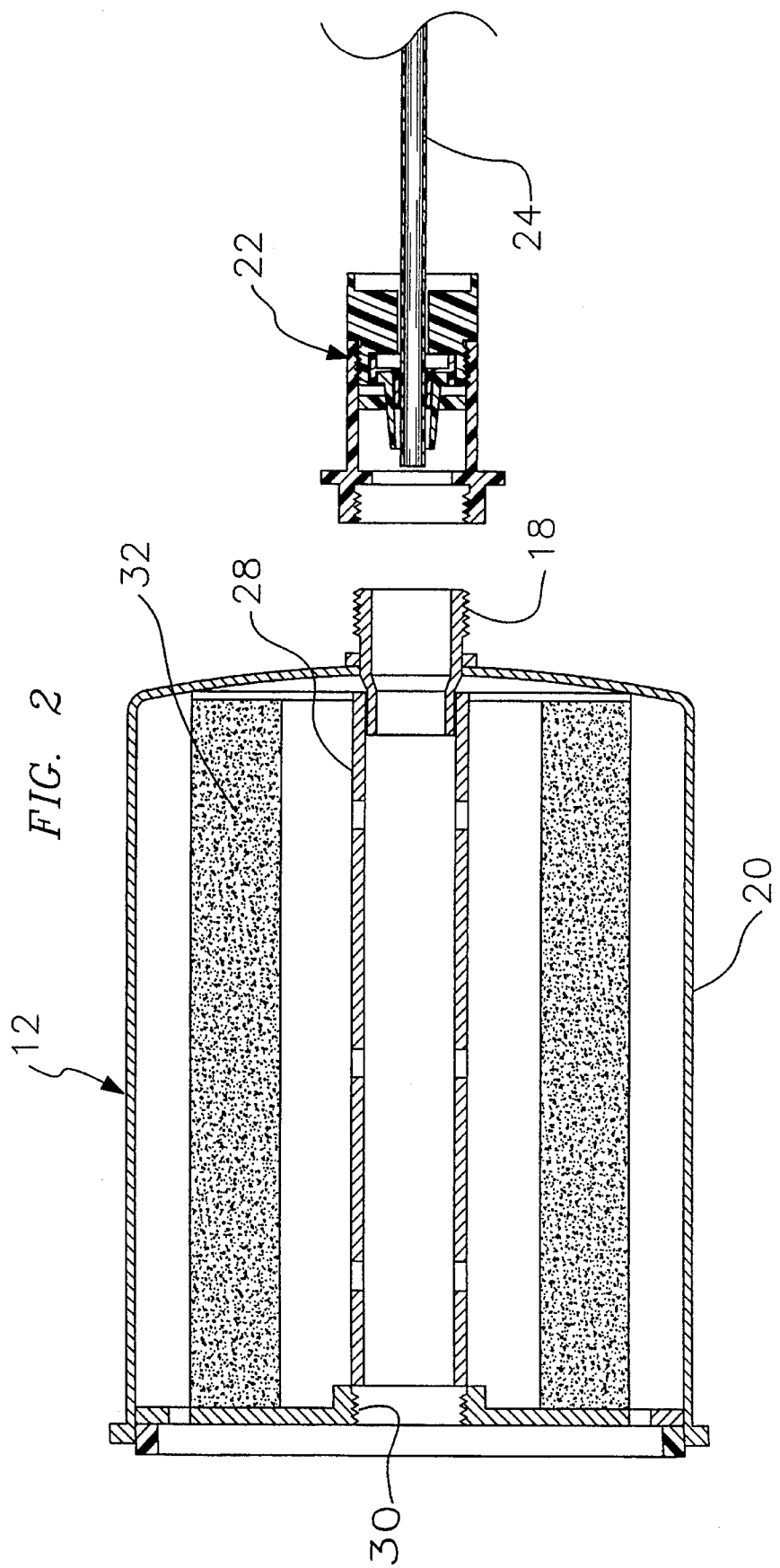
FIG. 2 is a cross sectional view of a portion of the present invention.

Referring now to FIGS. 2 through 4 wherein the present invention 10 is illustrated in detail, it can be shown that the oil filter 12 of the present invention 10 comprises a center tube 28 concentrically positioned within the exterior casing 20. The center tube 28 includes interior threads 30 which operate to couple with the oil filter fitting 14 of the engine 16 when the device 10 is attached thereto. A cylindrical filter 32 is concentrically positioned about the center tube 28 so as to filter oil directed radially of the center tube 28 through apertures in the center tube. The threaded fluid tap 18 extends through an end wall of the exterior casing 20 and into contiguous fluid communication with the center tube 28. When it is desired to utilize the oil filter 12 to filter oil passing through the engine, a closure cap 34 including a circular sealing disk 36 can be coupled to the threaded fluid tap 18 as shown in FIG. 4 of the drawings.

When it is desirable to drain oil from the engine 16 through the oil filter 12, the closure cap 34 can be removed from the threaded fluid tap 18 to permit securing of the coupling means 22 to the threaded fluid tap. To this end and as shown in FIG. 3, the coupling means 22 preferably comprises a coupling tube 38 having a first set of interior threads which can be mated with the exterior threads of the threaded fluid tap 18. An abutment plate 40 extends transversely across an interior of the coupling tube 38 and includes a center aperture within which a tapered compression fitting 42 is received. A bushing 44 is concentrically positioned about the fluid conduit 24 and positioned within the tapered compression fitting 42 such that the fluid conduit 24 projects concentrically through both the bushing 44, the tapered compression fitting 42, and the central aperture of the abutment plate 40. A seal 46 is concentrically positioned about the fluid conduit 24 and positioned so as to abuttingly engage a portion of the tapered compression fitting 42. A threaded boss 48 includes a central aperture directed therethrough permitting projection of the fluid conduit 24 through the central aperture such that the threaded boss 48 is concentrically positioned thereabout. The threaded boss 48 includes exterior threads cooperable with a second set of interior threads formed along an interior surface of the coupling tube 38. The threaded boss 48 can thus be threadably engaged to the second set of interior threads of the coupling tube 38 so as to axially advance the seal 46 and the tapered compression fitting 42. The tapered compression fitting 42 is axially advanced into the center aperture of the abutment plate 40 to cause a radial compression of the tapered compression fitting 42 about the bushing 44. The seal 46 is axially advanced against a portion of the tapered compression fitting 42 which subsequently forms a seal about the exterior of the fluid conduit 24. By this structure, the coupling means 22 can be easily coupled to a fluid conduit 24 of a desired length and subsequently coupled to the threaded fluid tap 18 of the oil filter 12 to permit draining of oil from the engine 16 into a container 26 as desired.

In use, the engine oil draining system 10 according to the present invention can be easily utilized to effect draining of oil from an engine 16 during an engine oil changing procedure. If desired, the engine 16 can be operating such that fluid is caused to flow through the drain conduit 24 under pressure generated by the oil pump of the engine, thereby ensuring a complete draining of oil from such engine 16 so that fresh oil can then be subsequently installed thereinto.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An engine oil draining system comprising:

an oil filter adapted to be coupled to an oil filter fitting of an engine, the oil filter includes an exterior casing; a center tube concentrically positioned within the exterior casing, the center tube including interior threads which are adapted to couple with an oil filter fitting of an engine, the center tube including apertures directed therethrough; and a cylindrical filter concentrically positioned about the center tube so as to filter oil directed radially of the center tube through the apertures in the center tube, a threaded fluid tap extends through the exterior casing and into contiguous fluid communication with the center tube, a coupling means for coupling a drain conduit into fluid communication with the threaded fluid tap comprising a coupling tube having a first set of interior threads adapted to be mated with exterior threads of the threaded fluid tap; an abutment plate extending transversely across an interior of the coupling tube and including a center aperture; and a tapered compression fitting received within the center aperture of the abutment plate; a seal adapted to be concentrically positioned about a fluid conduit, the seal being positioned within the coupling tube so as to abuttingly engage a portion of the tapered compression fitting; and a threaded boss including a central aperture directed therethrough permitting projection of the fluid conduit through the central aperture such that the threaded boss can be concentrically positioned thereabout, the threaded boss abutting the compression fitting and including exterior threads threadably engaged with a second set of interior threads formed along an interior surface of the coupling tube so as to permit axial advancing of the tapered compression fitting into the center aperture of the abutment plate to cause a radial compression of the tapered compression fitting to form a seal about an exterior of the fluid conduit, and the oil filter further includes a closure cap including a circular sealing disk, the closure cap being coupled to the threaded fluid tap.

2. The engine oil draining system of claim 1, wherein the coupling means further comprises a bushing concentrically positioned within the tapered compression fitting and adapted to receive the fluid conduit projecting concentrically through both the bushing and the tapered compression fitting.

* * * * *